United States Patent [19]

Stengel

[11] Patent Number: 5,109,530
[45] Date of Patent: Apr. 28, 1992

[54] RECEIVER WITH BATTERY SAVER

[75] Inventor: Robert E. Stengel, Fort Lauderdale, Fla.

[73] Assignee: Motorola, Inc., Schaumburg, Ill.

[21] Appl. No.: 602,607

[22] Filed: Oct. 24, 1990

[51] Int. Cl.⁵ .............................................. H04B 1/16
[52] U.S. Cl. .................. 455/38.3; 455/212; 455/343
[58] Field of Search .................. 455/35, 38, 228, 343, 455/212, 218; 340/825.44

[56] References Cited

U.S. PATENT DOCUMENTS

| | | | |
|---|---|---|---|
| 3,769,593 | 10/1973 | Williams | 325/492 |
| 4,370,753 | 1/1983 | Ehmke | 455/36 |
| 4,385,398 | 5/1983 | Wycoff et al. | 455/343 |
| 4,419,765 | 12/1983 | Wycoff et al. | 455/36 |
| 4,598,258 | 7/1986 | Babano | 455/343 |

Primary Examiner—Curtis Kuntz
Attorney, Agent, or Firm—Daniel K. Nichols; Mohammad Mansour Ghomeshi

[57] ABSTRACT

A receiver 100 used for recovering modulation signals modulated on a carrier signal is disclosed. The receiver 100 includes a detector 204 and a decoder 206 for detecting the presence of a non-valid coded squelch signal and decoding such signal in the recovered modulation signal. The receiver 100 further includes a synchronizer 208 for synchronizing the detected non-valid coded signal. Receiver 100 is placed in a battery saver mode when a non-valid coded squelch signal is detected. The battery saver mode includes monitoring the recovered modulation signal for a change in the non-valid coded squelch signal. The battery saver mode is departed once a change in the non-valid coded squelch signal is detected.

12 Claims, 3 Drawing Sheets

RECEIVER WITH BATTERY SAVER

TECHNICAL FIELD

This invention relates generally to receivers and is more specifically related to receivers having a battery saver circuit.

BACKGROUND

Battery saving circuits are used to minimize power consumption by periodically, rather than continuously, supplying power to a receiver. Presently known circuits operating in radio receivers periodically supply power, search for the presence of an RF (radio frequency) carrier and then, if a carrier is found, extend the time the power is supplied to permit a further search for a valid coded squelch signal (CSS). Such squelch operated battery savers have a significant disadvantage in that every receiver within a system is activated whenever any transmission of a carrier signal occurs, regardless of which individual receiver is intended to be reached. Typically the CSS detect time in many systems ranges from 110 to 170 msec. minimum with the presence of a strong signal condition. In these systems the receiver dead time or access delay is the sleep time plus receiver warm up and the carrier detect for a no carrier (inactive channel) condition. This dead time is increased by the time it takes to detect the CSS when there is activity on the channel. It is obvious that in busy systems these timing requirements put a major burden on the effectiveness of a squelch operated battery saver to the point where they are always up and checking the air waves either for carrier or CSS.

One solution to reduce the detection time in a squelch operated battery saver is to check the incoming CSS only once for a detected carrier. Thereafter the receiver checks for the presence of the carrier only and assume that the same CSS is being received for the duration of the detected carrier. This solution reduces the detection time significantly since the carrier detect time (6 to 15 ms) is considerably shorter than the CSS detect time. However such a solution introduces a new problem in situations where a second transmitter transmits a signal, perhaps an emergency signal, intended for a receiver that is in the sleep mode. The receiver wakes up periodically and determines that the carrier is still present and erroneously assumes that the CSS has not changed returning to its sleep mode. Such assumption results in the receiver not checking the received CSS which now contains the right code for this receiver further resulting in the missing of the signal from the second transmitter. This deficiency has rendered such a solution less desirable. It is therefore clear that a need exists for a battery saver method to effectively put a receiver in a sleep mode even in very busy systems without the loss of any incoming signals.

SUMMARY OF THE INVENTION

Briefly, according to the invention, a receiver for recovering modulation signals modulated on a carrier signal is disclosed. The receiver includes a detector and a decoder for detecting the presence of a non-valid coded squelch signal and decoding such signal in the recovered modulation signal. The receiver further includes a synchronizer for synchronizing the detected non-valid coded signal. Responsive to said detector the receiver is placed in a battery saver mode. The battery saver mode includes monitoring the recovered modulation signal for a change in the non-valid coded squelch signal. The battery saver mode is departed once a change in the non-valid coded squelch signal is detected.

In other aspect of the invention a method is disclosed for saving the battery energy in a portable radio having a receiver for recovering modulation signals modulated on a carrier signal is disclosed. The method includes steps of detecting the presence of a non-valid coded squelch signal, decoding such non-valid squelch signal, and synchronizing the receiver with the detected non-valid coded squelch signal. The method further includes the step of placing the portable radio in a battery saver mode.

DETAILED DESCRIPTION OF THE PREFERRED EMBODIMENT

Figure 1:
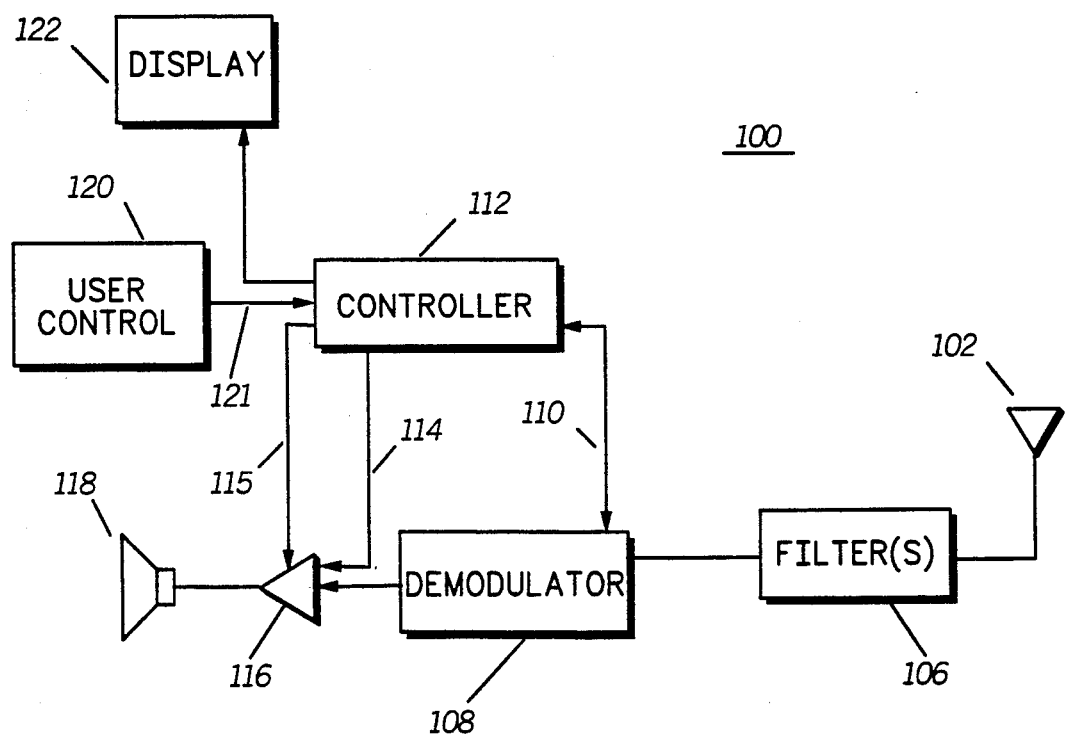
FIG. 1 shows a block diagram of a receiver in accordance with the present invention.

Referring to FIG. 1, a receiver 100 is shown in accordance with the present invention. The receiver 100 includes a filter(s) 106, a demodulator 108, a controller 112, a display 122, an amplifier 116, a speaker 118, and the user controls 120. The receiver 100 is substantially of conventional design as known in the art.

To receive a message, a radio frequency (RF) signal with a valid coded squelch signal (CSS) is routed from an antenna 102 to a demodulator 108 via the filter(s) 106. The demodulator 108 demodulates the incoming RF signal and submits portions of it to the controller 112 for further processing. Typically, the controller 112 decodes the valid CSS and operates to alert the radio user and proceeds to present the received message in a variety of ways depending upon the message type and optional features that may be enabled or disabled by the radio user. Thus the controller 112 may send an alert signal to an amplifier 116, via data line 114, to be presented to the radio operator via the speaker 118. After the alert, a voice message may be provided by the receiver 108 to the amplifier 116 for presentation via the speaker 118. Data messages would follow the radio's address code to the controller 112 via data line 110. These messages are subsequently analyzed by the controller 112 and if appropriate sent to a display 122 for presentation. Another function of the controller 112 of this embodiment is to evaluate the operation of the receiver 100 and determine whether it can be placed in a battery saver mode (BSM). For this purpose, the controller 112 contains several blocks intended to detect the presence of signals that would assist it in determining whether a switch to the BSM is appropriate. A portion of the controller 112 pertaining to the operation of the battery saver is shown in FIG. 2 in accordance with the present invention.

The period that the receiver 100 can remain in the BSM is proportional to the turn-off period of the received CSS. In communication systems a turn-off code or otherwise referred to as reverse burst is a signal transmitted at the end of each transmission to eliminate the squelch tail from being heard on the speaker of the receiver. The duration of this turn-off code, referred to ass turn-off period is normally 130 msec. for both tone coded squelch (TPL) and digital coded squelch (DPL) in Motorola products. (TPL and DPL are both Motorola trade marks). This turn-off period is used as the battery saver cycle time limit for the sleep time plus receiver warm-up time plus signal detect time. The battery saver mode (BSM) is defined as the time that certain elements of a receiver, such as; the synthesizer, and the amplifiers are either off or in the standby mode. During this period only minimal switching and timing circuits are functioning to coordinate the various states of the receiver resulting in reduced energy consumption. The opposite state of the BSM is referred to as receiver ON state. The receiver ON state is defined as the period that the receiver is on, either receiving and processing a signal with a valid CSS or checking the contents of a non-valid CSS to determine its next state.

Figure 2:
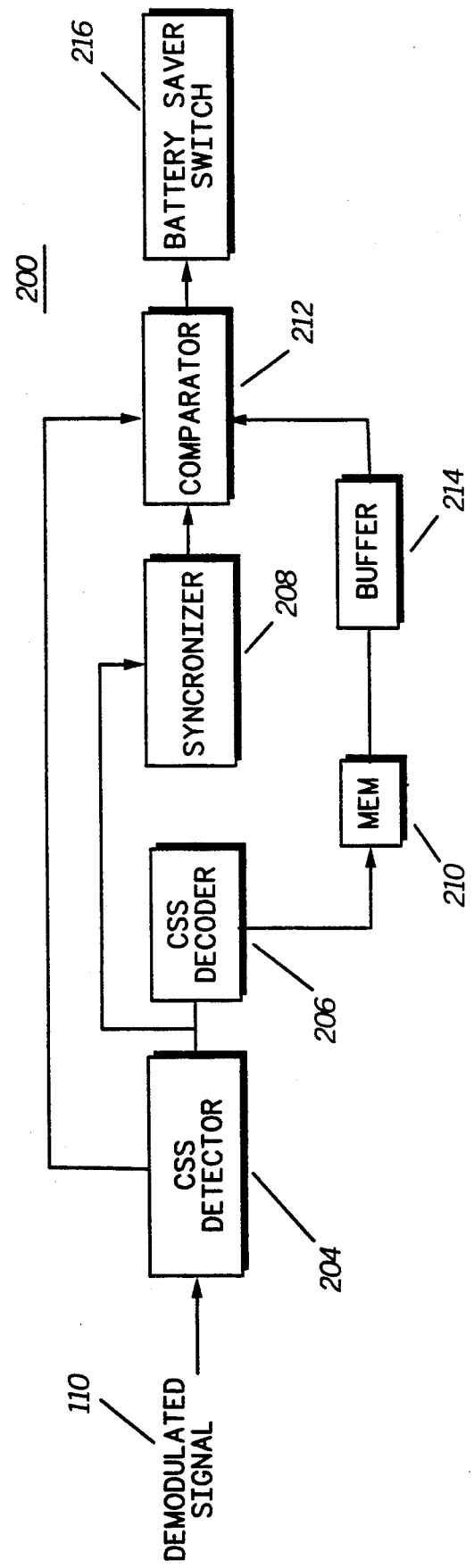
FIG. 2 is a block diagram of the internal elements of the controller used in the receiver of the present invention in accordance with the present invention.

Referring to FIG. 2 now, the demodulated signal 110 from the demodulator 108 is supplied to a CSS detector 204. The presence of a non-valid CSS is detected by the detector 204 and is subsequently branched to a CSS decoder 206 and a synchronizer 208. The detector 204 is optionally used in this embodiment to alert the receiver of new CSS detections. Its use is recommended in some applications but is not necessary to the objectives of this invention. The decoder 206 decodes the non-valid CSS using any well known techniques. One available method by which the decoder 206 decodes the detected CSS is by comparing it to a bank of available CSSs stored at a memory block 210 to determine which one has been received. Upon such determination the decoder 206 points at the location of the received CSS in the memory block 210. The memory block 210 responding to this pointer provides a replica of the received CSS at its output which is connected to a buffer 214.

The synchronizer 208 synchronizes the receiver 100 with the non-valid CSS detected by the detector 204. The output of the synchronizer 208 is connected to the sync. input of a comparator 212. The first input of the comparator 212 is connected to the output of the detector 204. The second input of the comparator 212 is connected to the buffer 214 which has a replica of the received non-valid CSS available at its output. The comparator 212, which is periodically receiving an update on the detected CSS from the detector 204, compares a small segment of the newly detected CSS to the same portion of the one in the buffer 214 synchronously using techniques well known in the art. The output of the comparator 212 which is a signal corresponding to the result of this comparison is connected to a battery saver switch 216. The comparator 212 sends a "switch to BSM" signal to the battery saver switch 216 in the event that the two compared segments of the squelch coded signals have remained the same. The fact that such segments have remained the same indicates that the received signal continues to have the same non-valid CSS and is therefore not intended for the receiver 100. The shorter it takes for the comparator 212 to determine that a freshly detected signal is not intended for the receiver 100 the longer the receiver 100 can remain in the BSM. With the output signal of the buffer 2134 and the freshly detected CSS synchronized, the comparator 212 can afford to check a segment of the two signals rather than their entire duration thereby greatly reducing the comparison time. Such great reduction in time requirements results in a speedier and a more efficient mean of determining whether the receiver 100 can be placed in the BSM. Additionally the time saved may be added to the time the receiver 100 can be in the BSM resulting in greater savings in the battery energy.

The synchronous comparison of segments of the two CSS is mainly aimed at reducing the time the receiver 100 needs to determine whether a newly detected CSS is the same as the one previously detected. As the receiver 100 wakes up from the battery saver mode, it is in sync with the incoming CSS. This condition affords the receiver 100 the ability to compare a small segment of the pre-determined non-valid CSS to this newly detected CSS which requires significantly less time than comparing the entire length of the CSSs. Such shortening of the comparison time affords a longer BSM period to the receiver 100. In some receivers the need for the synchronizer 208 may be eliminated by comparing the entire newly detected CSS to the one previously detected. This may require longer time to perform, however acceptable.

On the other hand if the two compared segments are determined to be different a signal to depart the BSM is sent to the battery saver switch 216. This would result in the receiver 100 remaining in the ON state and the battery saver cycle restarting. A difference in two CSSs occurs normally due to the reception of a turn-off code, a new CSS, or a weak signal with the same CSS. In the case of a turn-off code the receiver 100 is alerted that the next received signal is from a new transmission. Under certain circumstances a CSS change occurs without a turn-off code. One such circumstance is when a second transmitter makes an overlapping transmission over the first either intentionally or inadvertently. The earlier may be the result of an emergency, while the later may be due to equipment malfunction or the operator's disregard for proper equipment operation which calls for the monitoring of a channel before any transmissions on that channel. With this invention even the overlapping transmissions are detected and the receiver 100 is placed in the BSM. Another circumstance under which the CSS code changes without a turn-off code is when the receiver 100 enters a dead zone in its geographical area where a condition of insufficient signal strength is encountered. The reception of a signal with insufficient strength causes errors in the detected CSS and would result in the comparator 212 concluding that the CSS has changed. All these conditions would result in the receiver 100 remaining ON and restarting the battery saver cycle over.

Figure 3:
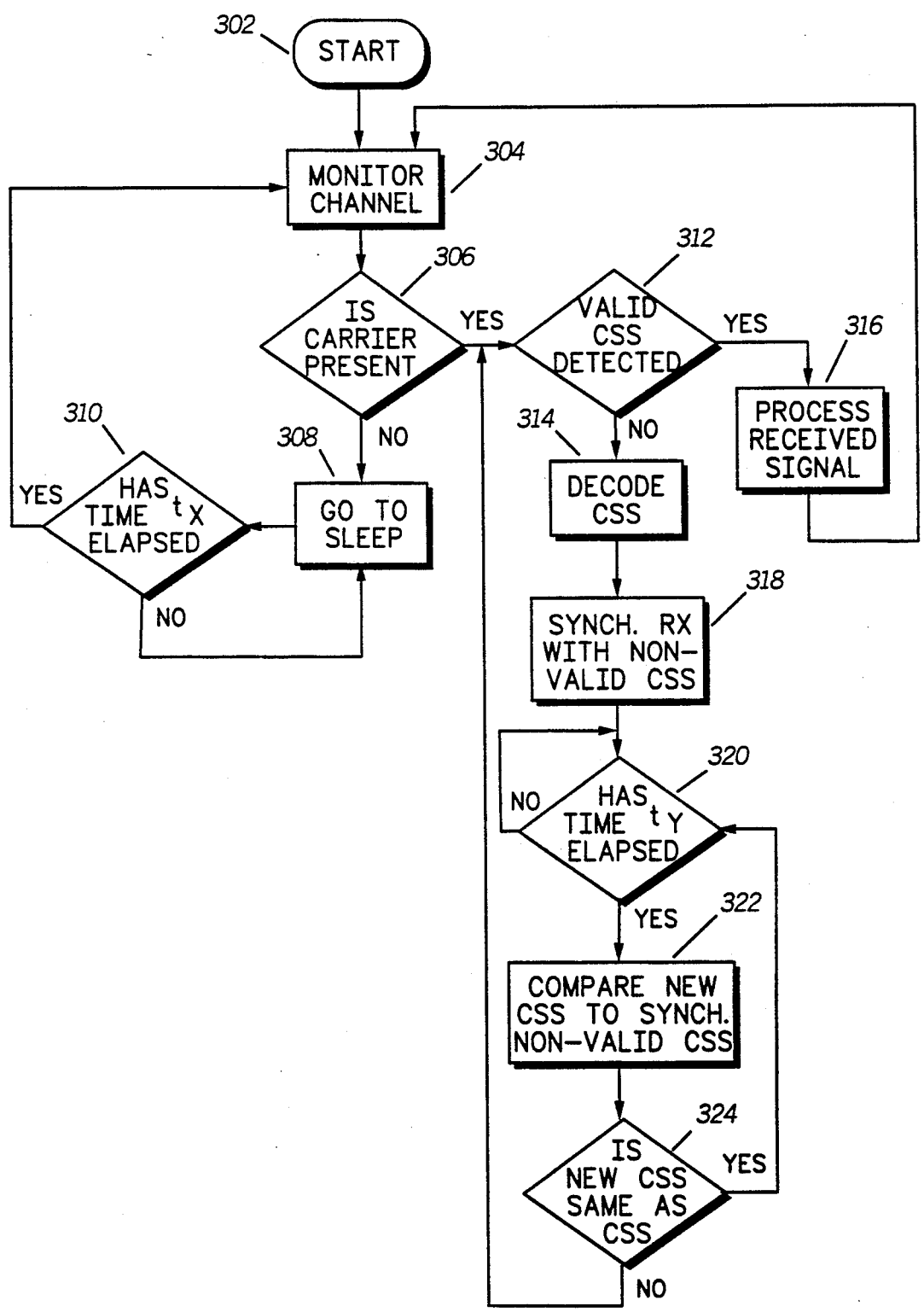
FIG. 3 is a flow chart of the operation of a battery saver in accordance with the present invention.

Referring to FIG. 3 a flow chart 300 of the operation of the battery saver 200 in conjunction with the operation of the receiver 100 is shown in accordance with the present invention. As is known in the art the controller 112 or any other elements of the receiver 100 may be programmed to perform the details of the flow chart 300. From the start block 302 the receiver 100 is monitoring the air waves for any carrier signals that may be on the same frequency as that of the receiver 100 via the "monitor channel" block 304. The output of the "monitor channel" block 304 is connected to a condition block 306 where a decision is made as to whether a carrier signal of the correct frequency has been detected. The NO output of the decision block 306 is connected to a "go to sleep" block 308 where the receiver 100 is put to sleep or otherwise transferred in to the battery saver mode (BSM). The output of the "go to sleep" block 308 is connected to a timer represented by the decision block 310. At this decision block 310 the time that the receiver 100 has been in the sleep mode is compared to $t_x$. $t_x$ is defined as the time that the receiver 100 can remain in the BSM with no carrier. $t_x$ may be different for various applications. The YES output of the decision block 310 which indicates that $t_x$ has elapsed is routed back to the monitor channel block 304. The NO output of the decision block 310 is looped back to the "go to sleep" block 308.

The YES output of the decision block 306 where the presence of a carrier is detected is connected to another decision block 312 where a decision is made as to whether a valid CSS code has been detected. The YES output of the decision block 312 is connected to a "process received signal" block 316. At this block 316 the received signal is processed by the appropriate circuits in the receiver 100. Upon cessation of the received signal the operation returns to block 304 where the channel activity is once again monitored. The NO output of the decision block 312, which indicates the detection of a non-valid CSS code, is connected to a "decode CSS" block 314. At the block 314 the detected non-valid CSS code is decoded to determine which one of the available CSS codes has been received. The output of the decode block 314 is connected to a block 318 where the receiver 100 is synchronized with the detected non-valid CSS code. This synchronization is used to reduce the detection time needed to determine a change in the freshly detected CSS code. In some applications the operation of the block 312 may be modified to decode the received CSS rather than detect it. In these applications block 314 is eliminated and all the rest of the blocks will operated as stated earlier.

The output of block 318 is connected to a decision block 320 where a timer is set to $t_y$. The NO output of the decision block 320 which indicates that the time $t_y$ has not elapsed is looped back to the decision block 320. The time $t_y$ is preferably equal to the turn-off period since this is the period that the transmitter is transmitting the turn-off code which can be missed by the user without any loss of valuable information. The YES output of the decision block 320 which indicates that the time $t_y$ has elapsed is connected to a comparison block 322. At this block 322 a segment of the non-valid CSS of the signal being received is synchronously compared to a replica of the previously received non-valid CSS decoded by the block 314. Since only a segment of the CSS code is used in this comparison, the overall time required is significantly reduced. The result of this comparison block 322 is submitted to a condition block 324 where a decision is made as to whether the newly detected CSS code is the same as the previously detected code. The YES output of the decision block 324 which indicates that no changes in the CSS codes were detected is routed back to the decision block 320 and $t_y$ is restarted. The looping back of the decision block 324 to the decision block 320 provides the means for periodically monitoring the recovered modulation signal for a change in the non-valid CSS. The NO output of the decision block 324 is routed to the input of the decision block 312 where the cycle of detecting a new CSS code and periodically monitoring its changes resumes.

The block 318 where the received non-valid CSS code is synchronized may be eliminated in receivers where enough time is available to compare the entire newly detected CSS to the previously detected CSS.

In summary the receiver 100 receives, recovers, and decodes a non-valid coded squelch signal (CSS) and goes to sleep after synchronizing with the non-valid CSS. Periodically the receiver 100 wakes up in sync with the non-valid CSS to quickly determine any change in the CSS. If no change in the CSS is determined the receiver 100 goes back to sleep. In the event that a change is determined the battery saver mode is departed and the receiver 100 continues to receive information

What is claimed is:

1. A method for saving battery energy in a radio, having a receiver for receiving a carrier signal to produce a recovered signal, comprising the steps of:
   decoding a non-valid coded squelch signal in said recovered signal;
   synchronizing said receiver with said decoded non-valid coded squelch signal;
   placing said portable radio in a sleep mode;
   periodically waking up in sync with the non-valid coded squelch signal and rapidly detecting when the same non-valid coded squelch signal is present; and
   returning to the sleep mode in response to the detecting of the non-valid coded squelch signal.

2. The method according to claim 1, further comprising the steps of:
   detecting the absence of the non-valid coded squelch signal in said recovered signal;
   decoding a second squelch signal; and
   returning to the sleep mode when the second squelch signal is non-valid.

3. The method of claim 2, wherein said determined change in coded squelch signal is due to an overlapping transmission.

4. The method of claim 2, wherein said determined change in coded squelch signal is due to a reduction in the received signal strength.

5. The method of claim 1, further including the step of:
   rapidly detecting when a different non-valid coded squelch signal is present; and
   departing the sleep mode in response to detecting the different non-valid coded squelch signal.

6. The method of claim 1, further including the step of detecting a valid squelch coded signal and proceeding to receive the signal.

7. A receiver, comprising:
   means for receiving a carrier signal to produce a recovered signal;
   means for decoding the recovered signal to detect the presence of a recovered non-valid coded squelch signal;
   means for synchronizing said receiver with said non-valid coded squelch signal, and
   means for placing said receiver in a battery saver mode responsive to said means for synchronizing.

8. The receiver of claim 7, wherein said battery saver mode comprises:
   means for periodically monitoring said recovered modulation signal for a change in said non-valid coded squelch signal.

9. The receiver of claim 8, further comprising:
   means for detecting a change in the non-valid coded squelch signal, and
   means for departing said battery saver mode in response to the means for detecting.

10. The receiver of claim 9, wherein said determined change in coded squelch signal is due to an overlapping transmission.

11. The receiver of claim 10, wherein said change in the non-valid coded squelch signal is due to a reduction in the received signal strength.

12. A receiver comprising:

means for receiving a signal having a non-valid coded squelch signal;

means for decoding said non-valid coded squelch signal;

means for synchronizing to said non-valid coded squelch signal;

means for placing said receiver in a battery saver mode;

means for periodically and synchronously monitoring the received signal to detect any change in the non-valid coded squelch signal; and means for departing the battery saver mode in response to the detection of change in the non-valid coded squelch signal.

* * * * *